(12) United States Patent
Song et al.

(10) Patent No.: US 11,997,268 B2
(45) Date of Patent: *May 28, 2024

(54) METHOD AND DEVICE FOR SUBBAND CODING FREQUENCY CONVERSION UNIT, AND METHOD AND DEVICE FOR IMAGE ENCODING/DECODING USING SAME

(71) Applicant: SK TELECOM CO., LTD., Seoul (KR)

(72) Inventors: Jinhan Song, Seoul (KR); Jeongyeon Lim, Seongnam-si (KR); Haekwang Kim, Seoul (KR); Joohee Moon, Seoul (KR); Yunglyul Lee, Seoul (KR); Jongki Han, Seoul (KR); Byeungwoo Jeon, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,878

(22) Filed: Oct. 21, 2022

(65) Prior Publication Data
US 2023/0064030 A1 Mar. 2, 2023

Related U.S. Application Data

(63) Continuation of application No. 13/811,581, filed as application No. PCT/KR2011/004906 on Jul. 5, 2011, now Pat. No. 11,509,894.

(30) Foreign Application Priority Data

Jul. 19, 2010 (KR) .......................... 10-2010-0069663

(51) Int. Cl.
*H04N 19/119* (2014.01)
*H04N 19/124* (2014.01)
(Continued)

(52) U.S. Cl.
CPC ......... *H04N 19/119* (2014.11); *H04N 19/124* (2014.11); *H04N 19/129* (2014.11);
(Continued)

(58) Field of Classification Search
CPC .. H04N 19/119; H04N 19/124; H04N 19/129; H04N 19/182; H04N 19/436;
(Continued)

(56) References Cited

U.S. PATENT DOCUMENTS

| 6,763,139 B1 | 7/2004 | Andrew |
| 6,804,402 B2 | 10/2004 | Andrew |

(Continued)

FOREIGN PATENT DOCUMENTS

| EP | 1330038 A1 | 7/2003 |
| JP | 09-084010 A | 3/1997 |

(Continued)

OTHER PUBLICATIONS

International Search Report dated Feb. 24, 2012, for corresponding International Patent Application No. PCT/KR2011/004906.
(Continued)

*Primary Examiner* — Anner N Holder
(74) *Attorney, Agent, or Firm* — Hauptman Ham, LLP (57) ABSTRACT

The present disclosure provides a method and apparatus for subband-coding a frequency conversion unit and a video encoding/decoding method a video encoding/decoding apparatus using the same. The method and the apparatus for subband-coding the frequency conversion unit include generating an encoding stream by splitting the frequency conversion unit into one or more frequency domains, generating frequency domain encoding information according to whether there is a non-zero frequency coefficient in each frequency domain, scanning the frequency coefficient of each frequency domain to generate a frequency domain
(Continued)

frequency coefficient stream, and binarizing and encoding the frequency domain encoding information and the scanned frequency domain frequency coefficient stream.

5 Claims, 7 Drawing Sheets

(51) Int. Cl.
  *H04N 19/129* (2014.01)
  *H04N 19/182* (2014.01)
  *H04N 19/436* (2014.01)
  *H04N 19/625* (2014.01)
  *H04N 19/63* (2014.01)
  *H04N 19/70* (2014.01)
  *H04N 19/91* (2014.01)

(52) U.S. Cl.
  CPC ......... *H04N 19/182* (2014.11); *H04N 19/436* (2014.11); *H04N 19/625* (2014.11); *H04N 19/63* (2014.11); *H04N 19/70* (2014.11); *H04N 19/91* (2014.11)

(58) Field of Classification Search
  CPC ...... H04N 19/625; H04N 19/63; H04N 19/70; H04N 19/91
  See application file for complete search history.

(56) References Cited

U.S. PATENT DOCUMENTS

| | | | |
|---|---|---|---|
| 7,088,866 | B2 | 8/2006 | Andrew |
| 2002/0027954 | A1 | 3/2002 | Singh et al. |
| 2003/0063809 | A1 | 4/2003 | Andrew |
| 2005/0063470 | A1 | 3/2005 | Bottreau et al. |
| 2006/0133680 | A1 | 6/2006 | Bossen |
| 2006/0291556 | A1 | 12/2006 | Watanabe et al. |
| 2009/0003447 | A1 | 1/2009 | Christoffersen et al. |
| 2009/0273706 | A1 | 11/2009 | Tu et al. |
| 2010/0034473 | A1 | 2/2010 | Sadasue et al. |
| 2011/0182523 | A1* | 7/2011 | Kim ................. H04N 19/176 382/233 |
| 2011/0206135 | A1 | 8/2011 | Drugeon et al. |

FOREIGN PATENT DOCUMENTS

| | | |
|---|---|---|
| JP | 2006-333500 A | 12/2006 |
| KR | 10-2000-0009743 A | 2/2000 |
| KR | 10-2008-0021268 A | 3/2008 |
| KR | 10-2009-0097014 A | 9/2009 |
| WO | 2006-118288 A1 | 11/2006 |

OTHER PUBLICATIONS

Thomas Wedi et al.; "Advances in Hybrid Video Coding"; 2007; pp. 1-14; vol. 6508; 650812; SPIE-IS&T; Panasonic R&D Center Germany. cited in NPL No. 12.

Sugimoto et al., "Proposal on Improved Entropy Coding Method for DCT coefficients", Joint Collaborative Team on Video Coding (JCT-VC) of ITU-T SG16 WP3 and ISO/IEC JTC1/SC29/WG11, 2nd Meeting, Jul. 21-28, 2010, 8 pages, Geneva , cited in NPL No. 12.

Iole Moccagatta et al, Technical evidences in support of USNB comment 13198-70, Clauses 6.2.9.9 and 6.2.9.11 Minor Technical, Still Texture, Oct. 1998, Atlantic City, pp. 1-5. cited in NPL No. 6.

Liu Q et al, Hardware-Oriented Early Detection Algorithms for 4 x 4 and 8 x 8 All-Zero Blocks in H.264, Apr. 2009, (9 pages). cited in NPL Nos. 7 and 12.

European Office Action dated Apr. 10, 2018 in connection with the counterpart European Patent Application No. 15191898.4-1208.

European Office Action dated Apr. 16, 2018 in connection with the counterpart European Patent Application No. 15191905.7-1208.

Chinese Office Action dated May 3, 2018 in connection with the counterpart Chinese Patent Application No. 201610223527.X.

Chinese Office Action dated May 3, 2018 in connection with the counterpart Chinese Patent Application No. 201610223529.9.

Chinese Office Action dated May 3, 2018 in connection with the counterpart Chinese Patent Application No. 201610223956.7.

Chinese Office Action dated May 31, 2018 in connection with the counterpart Chinese Patent Application No. 201610223480.7.

European Office Action dated Apr. 9, 2019 in connection with the counterpart European Patent Application No. 15191905.7 (10 pages).

Qualcomm Inc: "Video Coding Using Extended Block Sizes", Telecommunication Standardization Sector, Jan. 2009, pp. 1-4. cited in NPL No. 12.

* cited by examiner

FIG. 1

Split 8 x 8 Frequency Conversion
Unit into 4 x 4 Frequency Domains

*FIG. 3A*

Split 16 x 16 Frequency Conversion
Unit into 4 x 4 Frequency Domains

*FIG. 3B*

Split 16 x 8 Frequency Conversion
Unit into 4 x 4 Frequency Domains

*FIG. 3C*

Split 16 x 16 Frequency Conversion
Unit into 8 x 8 Frequency Domains

*FIG. 3D*

Split 8 x 8 Frequency Conversion
Unit into 4 x 4 Frequency Domain and
Remaining Frequency Domain

*FIG. 3E*

Split 16 x 16 Frequency Conversion
Unit into Hierarchical Frequency
Domains (Split 16 x 16 Frequency
Conversion Unit into 8 x 8 Frequency
Domains, and then split 8 x 8 Frequency
Domain into 4 x 4 Sub Frequency
Domains When There is Frequency
Which is not "0" in Low Frequency 8 x
8 Frequency Domain)

METHOD AND DEVICE FOR SUBBAND CODING FREQUENCY CONVERSION UNIT, AND METHOD AND DEVICE FOR IMAGE ENCODING/DECODING USING SAME

CROSS-REFERENCE TO RELATED APPLICATIONS

The present application is a continuation of U.S. patent application Ser. No. 13/811,581, filed on Apr. 10, 2013, which is a national stage filing under 35 U.S.C. § 371 of PCT/KR2011/004906 filed on Jul. 5, 2011 which is based upon and claims the benefit of priorities to Korean Patent Application No. 10-2010-0069663, filed on Jul. 19, 2010, in the Korean Intellectual Property Office, which are incorporated herein in their entireties by reference.

TECHNICAL FIELD

The present disclosure relates in some embodiments to a method and an apparatus for subband-coding a frequency conversion unit, and a method and an apparatus for video encoding/decoding using the same. More particularly, the present disclosure in applications for encoding and decoding the frequency conversion unit of a frequency-converted block relates to a method and an apparatus for subband-coding the frequency conversion unit, and a method and an apparatus for video encoding/decoding using the same wherein the frequency conversion unit is split into at least one frequency domain so that frequency domain encoding information is encoded to indicate the possible existence of a non-zero frequency coefficient in each frequency domain, and thereby enhance the video compression efficiency.

BACKGROUND

The statements in this section merely provide background information related to the present disclosure and may not constitute prior art.

Moving Picture Experts Group (MPEG) and Video Coding Experts Group (VCEG) together stepped ahead of the existing MPEG-4 Part 2 and H.263 standard methods to develop a better and more excellent video compression technology. The new standard is called H.264/AVC (Advanced Video Coding) and was released simultaneously as MPEG-4 Part 10 AVC and ITU-T Recommendation H.264.

H.264/AVC (hereinafter referred to as 'H.264') standard performs an intra/inter prediction process by the unit of macroblock having different shapes of subblocks to generate a residual signal. A 4×4 subblock level frequency conversion unit of the generated residual signal is then encoded through processes including a frequency transform, quantization, entropy encoding.

Recent video compression technologies are under development to meet the demand for ultra high resolution videos, and the international standard organizations of MPEG and VCEG are jointly developing an HEVC video encoding standard by the name of JCT. It has been empirically proven that, other than typical 4×4 and 8×8 frequency units often used in conventional video compression technologies, larger frequency conversion units such as 16×16 are of great help to improve the video compression efficiency. However, a single complete scanning over such a 16×16 block by the conventional method causes difficulty in devising and implementing an efficient frequency coefficient encoding method and apparatus depending on the video characteristics.

DISCLOSURE

Technical Problem

Therefore, to solve the above-mentioned problems, the present disclosure seeks to improve the present disclosure in applications for encoding and decoding the frequency conversion unit of a frequency-converted block relates to a method and an apparatus for subband-coding the frequency conversion unit, and a method and an apparatus for video encoding/decoding using the same wherein the frequency conversion unit is split into at least one frequency domain so that frequency domain encoding information is encoded to indicate the possible existence of a non-zero frequency coefficient in each frequency domain, and thereby enhance the video compression efficiency.

SUMMARY

An embodiment of the present disclosure provides a video encoding/decoding apparatus. The video encoding/decoding apparatus includes a video encoder and a video decoder. The video encoder predicts a current block to generate a predicted block, subtracts the predicted block from the current block to generate a residual block, transforms and quantizes the residual block to generate a frequency conversion block, splits a frequency conversion unit of the frequency conversion block into one or more frequency domains, identifies whether there is a non-zero frequency coefficient in each frequency domain to generate frequency domain encoding information, scanning the frequency coefficient of each frequency domain to generate a frequency domain frequency coefficient stream, and binarizes and encodes the frequency domain encoding information and the scanned frequency domain frequency coefficient stream. The video decoder receives encoded data to extract frequency domain encoding information and a frequency domain frequency coefficient stream, splits the frequency conversion unit into one or more frequency domains according to the frequency domain encoding information, inversely scans the frequency domain frequency coefficient stream according to the frequency domain encoding information and sets a quantization coefficient to reconstruct a transformed and quantized frequency conversion block, inversely quantizes and inversely transforms the frequency conversion block to reconstruct the residual block, predicts a current block to generate a predicted block, and adds the reconstructed residual block and the predicted block to reconstruct the current block.

An embodiment of the present disclosure provides a video encoding apparatus. The video encoding includes a predictor, a subtractor, a transformer and quantizer, and an encoder. The predictor predicts a current block to generate a predicted block. The subtractor subtracts the predicted block from the current block to generate a residual block. The transformer and quantizer transforms and quantizes the residual block to generate a frequency conversion block. The encoder receives the frequency conversion block to split a frequency conversion unit of the frequency conversion block into one or more frequency domains, identifies whether there is a non-zero frequency coefficient in each frequency domain to generate frequency domain encoding information, scans a frequency coefficient of each frequency domain to generate a frequency domain frequency coefficient stream, and binarizes and encodes the frequency domain encoding information and the scanned frequency domain frequency coefficient stream.

An embodiment of the present disclosure provides a video decoding apparatus. The video decoding apparatus includes a decoder, an inverse quantizer and inverse transformer, a predictor, and an adder. The decoder receives encoded data to extract frequency domain encoding information and a frequency domain frequency coefficient stream, splits a frequency conversion unit into one or more frequency domains according to the frequency domain encoding information, and inversely scans the frequency domain frequency coefficient stream according to the frequency domain encoding information and sets a quantization coefficient to reconstruct a transformed and quantized frequency conversion block. The inverse quantizer and inverse transformer inversely quantizes and inversely transforms the frequency conversion block to reconstruct a residual block. The predictor predicts a current block to generate a predicted block. The adder adds the reconstructed residual block and the predicted block to reconstruct the current block.

An embodiment of the present disclosure provides an apparatus for subband-coding a frequency conversion unit. The apparatus includes a frequency domain splitter, a frequency domain encoding information generator, a frequency domain scan unit, and an encoding stream generator. The frequency domain splitter receives a frequency conversion block to split a frequency conversion unit of the frequency conversion block into one or more frequency domains. The frequency domain encoding information generator identifies whether there is a non-zero frequency coefficient in each frequency domain to generate frequency domain encoding information. The frequency domain scan unit receives the frequency domain encoding information and scans a frequency coefficient of each frequency domain to generate a frequency domain frequency coefficient stream. The encoding stream generator binarizes and encodes the frequency domain encoding information and the scanned frequency domain frequency coefficient stream.

An embodiment of the present disclosure provides a video encoding/decoding method. The video encoding/decoding method includes encoding a video by predicting a current block to generate a predicted block, subtracting the predicted block from the current block to generate a residual block, transforming and quantizing the residual block to generate a frequency conversion block, splitting a frequency conversion unit of the frequency conversion block into one or more frequency domains, identifying whether there is a non-zero frequency coefficient in each frequency domain to generate frequency domain encoding information, scanning the frequency coefficient of each frequency domain to generate a frequency domain frequency coefficient stream, and binarizing and encoding the frequency domain encoding information and the scanned frequency domain frequency coefficient stream. The video encoding/decoding method also includes decoding a video by receiving encoded data to extract frequency domain encoding information and a frequency domain frequency coefficient stream, splitting a frequency conversion unit into one or more frequency domains according to the frequency domain encoding information, inversely scanning the frequency domain frequency coefficient stream according to the frequency domain encoding information and setting a quantization coefficient to reconstruct a transformed and quantized frequency conversion block, inversely quantizing and inversely transforming the frequency conversion block to reconstruct a residual block, predicting a current block to generate a predicted block, and adding the reconstructed residual block and the predicted block to reconstruct the current block.

An embodiment of the present disclosure provides a video encoding method. The video encoding method includes predicting a current block to generate a predicted block. The video encoding method includes subtracting the predicted block from the current block to generate a residual block. The video encoding method includes transforming and quantizing the residual block to generate a frequency conversion block. The video encoding method includes performing an encoding by receiving the frequency conversion block to split a frequency conversion unit of the frequency conversion block into one or more frequency domains, identifying whether there is a non-zero frequency coefficient in each frequency domain to generate frequency domain encoding information, scanning a frequency coefficient of each frequency domain to generate a frequency domain frequency coefficient stream, and binarizing and encoding the frequency domain encoding information and the scanned frequency domain frequency coefficient stream.

An embodiment of the present disclosure provides a video decoding method. The video decoding method includes performing a decoding by receiving encoded data to extract frequency domain encoding information and a frequency domain frequency coefficient stream, splitting a frequency conversion unit into one or more frequency domains according to the frequency domain encoding information, inversely scanning a frequency domain frequency coefficient stream according to the frequency domain encoding information and setting a quantization coefficient to reconstruct a transformed and quantized frequency conversion block. The video decoding method includes inversely quantizing and inversely transforming a frequency conversion block to reconstruct a residual block. The video decoding method includes predicting a current block to generate a predicted block. The video decoding method includes adding the reconstructed residual block and the predicted block to reconstruct the current block.

An embodiment of the present disclosure provides a method of subband-coding a frequency conversion unit. The method includes a process responsive to receiving a frequency conversion block for splitting a frequency conversion unit of the frequency conversion block into one or more frequency domains. The method includes identifying whether there is a non-zero frequency coefficient in each frequency domain to generate frequency domain encoding information. The method includes scanning the frequency domain by receiving the frequency domain encoding information and scanning a frequency coefficient of each frequency domain to generate a frequency domain frequency coefficient stream, the method includes generating an encoding stream by binarizing and encoding the frequency domain encoding information and the scanned frequency domain frequency coefficient stream.

Advantageous Effects

According to the present disclosure as described above, in encoding and decoding a frequency conversion unit of a frequency conversion block, a video compression efficiency can be improved and an implementation can be simplified by splitting the frequency conversion unit into one or more frequency domains, encoding frequency domain encoding information so that it is indicated whether there is a non-zero frequency coefficient in each frequency domain, and encoding the frequency conversion block with reflection of video characteristics.

DETAILED DESCRIPTION

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Hereinafter, a video encoding apparatus, a video decoding apparatus, and an apparatus for subband-coding a frequency conversion unit described below may be user terminals such as a Personal Computer (PC), a notebook computer, a Personal Digital Assistant (PDA), a Portable Multimedia Player (PDA), a PlayStation Portable (PSP), a wireless communication terminal, a smart phone and the like, or server terminals such as an application server, a service server and the like, and may refer to various apparatuses including a communication apparatus such as a communication modem and the like for performing communication with various types of devices or a wired/wireless communication network, a memory for storing various types of programs and data for encoding or decoding a video, or performing an inter or intra prediction for the encoding or decoding, and a microprocessor and the like for executing the program to perform an operation and a control.

Further, a video encoded into a bitstream by the video encoding apparatus is transmitted in real time or non-real-time to the video decoding apparatus through wired/wireless communication networks such as an Internet, a short distance wireless communication network, a WiBro (aka WiMax) network, a mobile communication network and the like or through various communication interfaces such as a cable, a Universal Serial Bus (USB) and the like, and thus decoded in the video decoding apparatus and reconstructed and reproduced as the video.

A video typically may include a series of pictures each of which is split into predetermined domains, such as frames or blocks. When the domain of the video is split into blocks, the split blocks may be classified into an intra block or an inter block depending on an encoding method. The intra block means a block that is encoded through an intra prediction coding method which generates a predicted block by predicting a pixel of a current block using pixels of a reconstructed block that underwent previous encoding and decoding and then encodes a differential value between the predicted block and the pixel of the current block within a current picture where the current encoding is performed. The inter block means a block that is encoded through an inter prediction encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

Figure 1:
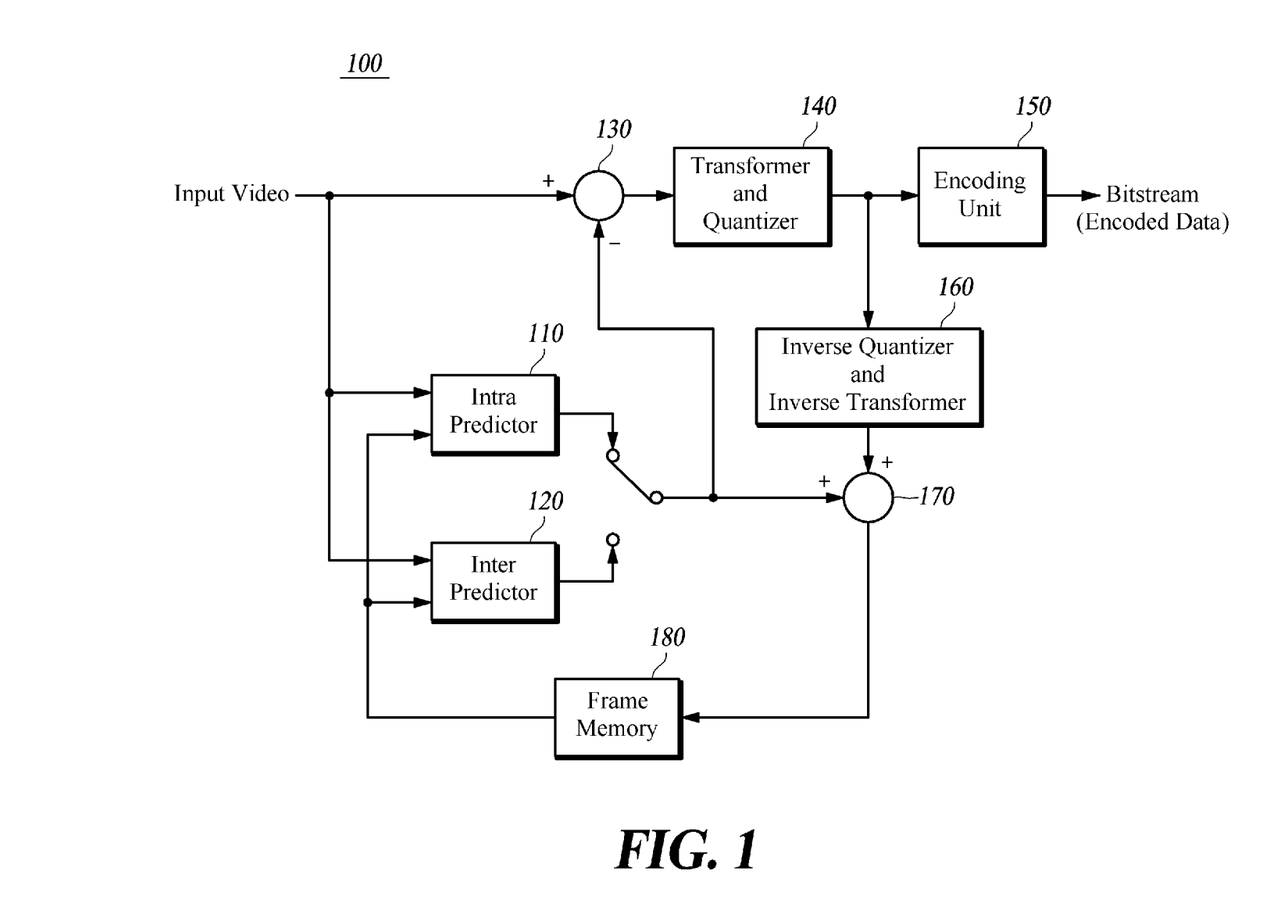
FIG. 1 is a block diagram schematically illustrating a video encoding apparatus according to an embodiment of the present disclosure.

FIG. 1 is a block diagram schematically illustrating a video encoding apparatus according to an embodiment of the present disclosure.

A video encoding apparatus 100 according to an embodiment of the present disclosure may include a predictor 110 or 120, a subtractor 130, a transformer and quantizer 140, an encoder 150, an inverse quantizer and inverse transformer 160, an adder 170, and a frame memory 180.

An input video to be encoded is input by the unit of macroblock. The macroblock has an M×N type, and M and N have a size of $2^n$, respectively, or M and N may be the same as or different from each other in the present disclosure. Accordingly, the macroblock in the present disclosure may be the same as or larger than the macroblock in the H.264 standard.

The predictor 110 or 120 predicts a current block to generate a predicted block. That is, the predictor 110 or 120 predicts a pixel value of each pixel of the current block to be encoded in the video to generate the predicted block having the predicted pixel value of each pixel. Here, the predictor 110 or 120 can predict the current block by using an intra prediction by the intra predictor 110 or an inter prediction by the inter predictor 120.

The intra predictor 110 generates the predicted block by using adjacent pixels in order to predict a current macroblock. That is, the intra predictor 110 generates the predicted block according to a mode of the intra predictor 110 by using the adjacent pixels of the current macroblock which have been already reconstructed through an encoding process.

The inter predictor 120 generates the predicted block by using a different frame in order to predict the current macroblock. That is, the inter predictor 120 generates a motion vector through a motion estimation according to a mode of the inter predictor 120 in a previous frame which has been already reconstructed through an encoding process, and generates the predicted block in a motion compensation process using the motion vector.

The subtractor 130 subtracts the predicted block from the current block to generate a residual block. That is, the subtractor 130 calculates a difference between the pixel value of each pixel of the current block to be encoded and a pixel value of the predicted block generated by the intra predictor 110 or the inter predictor 120 to generate the residual block having a residual signal in a block type.

The transformer and quantizer 140 transforms and quantizes the residual block generated by the subtractor 130 to a frequency coefficient. Here, a transform method may use a technique for converting a video signal of a spatial domain to a video signal of a frequency domain such as a Hadamard transform, or a discrete cosine transform based integer transform (hereinafter, referred to as an "integer transform"), and a quantization method may use various quantization techniques such as a Dead Zone Uniform Threshold Quantization (hereinafter, referred to as a "DZUTQ") or a quantization weighted matrix.

The encoder 150 encodes the residual block transformed and quantized by the transformer and quantizer 140 to generate encoded data.

Such an encoding technology may include an entropy encoding technology, but is not limited thereto and may include various different encoding technologies.

Further, the encoder 150 may insert various information required for decoding the encoded bitstream as well as the bitstream encoded from quantization frequency coefficients in the encoded data. That is, the encoded data may include a first field containing a Coded Block Pattern (CBP), and a bitstream encoded from a delta quantization coefficient (or parameter) and the quantization frequency coefficient, and a second field containing a bit for information required for the prediction (for example, an intra prediction mode in the intra prediction, the motion vector in the inter prediction or the like).

Figure 2:
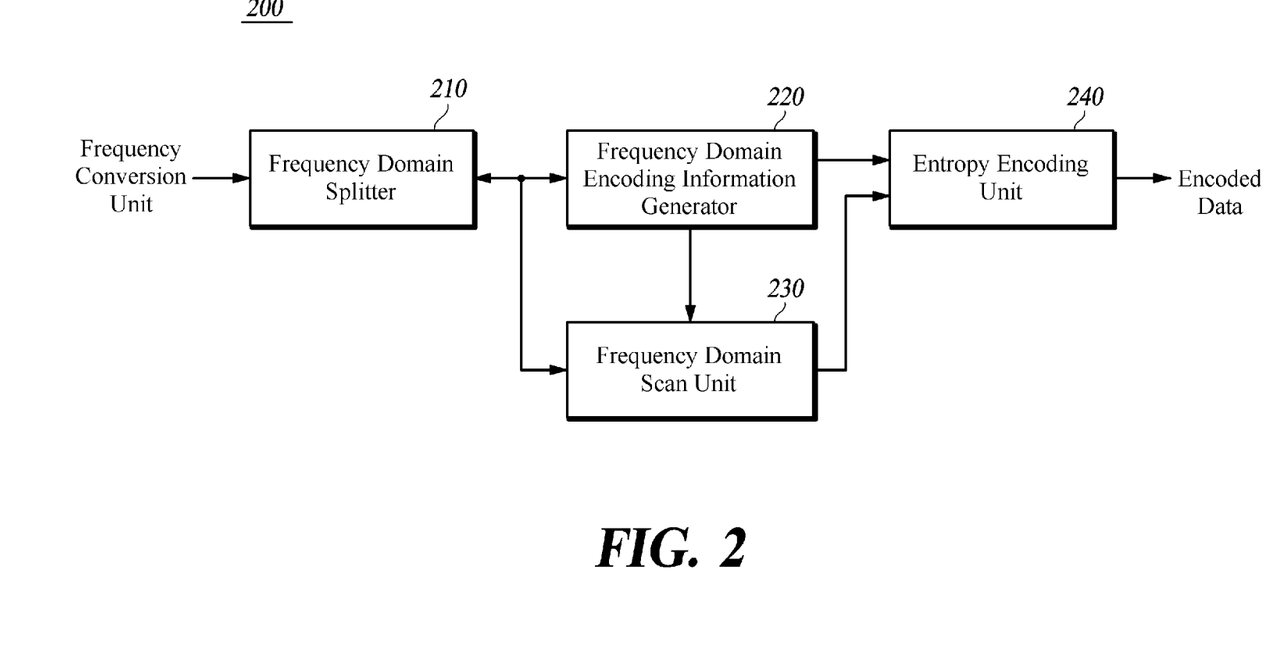
FIG. 2 is a block diagram illustrating an apparatus 200 for subband-coding a frequency conversion unit according to an embodiment of the present disclosure.

Unlike the H.264 standard, when the encoder 150 encodes the residual block of the quantized frequency coefficient in the embodiment of the present disclosure, the encoder 150 splits a frequency conversion unit of the residual block (that is, frequency conversion block) of the quantized frequency coefficient into one or more of frequency domains, identifies whether there is a non-zero frequency coefficient in each frequency domain, generates frequency domain encoding information indicating whether there is the non-zero frequency coefficient in each frequency domain, and encodes the frequency domain encoding information. When the corresponding frequency domain encoding information indicates that there is the non-zero frequency coefficient in the frequency domain, the encoder 150 can scan and encode the quantized frequency coefficient of the frequency domain. A description of a detailed operation of the encoder 150 will be made in detail through a description of an apparatus 200 for subband-coding the frequency conversion unit according to an embodiment of the present disclosure since a function of the apparatus 200 for subband-coding the frequency conversion unit according to the embodiment of the present disclosure described below may be included in a function of the encoder 150.

The inverse quantizer and inverse transformer 160 inversely quantizes and inversely transforms the residual block transformed and quantized by the transformer and quantizer 140 to reconstruct the residual block. The inverse quantization and the inverse transform may be achieved by inversely performing the transform process and the quantization process performed by the transformer and quantizer 140. That is, the inverse quantizer and inverse transformer 160 can perform the inverse quantization and the inverse transform by inversely performing the transform and the quantization performed by the transformer and quantizer 140 by using information (for example, information on a transform type and a quantization type) related to the transform and the quantization generated and transmitted from the transformer and quantizer 140.

The adder 170 adds the predicted block predicted by the predictor 110 or 120 and the residual block inversely quantized and inversely transformed by the inverse quantizer and inverse transformer 160 to reconstruct the current block.

The frame memory 180 stores the block reconstructed by the adder 170 and uses the stored block as a reference block in order to generate the predicted block in performing the intra prediction or the inter prediction.

FIG. 2 is a block diagram illustrating the apparatus 200 for subband-coding the frequency conversion unit according to an embodiment of the present disclosure.

The apparatus 200 for subband-coding the frequency conversion unit according to an embodiment of the present disclosure includes a frequency domain splitter 210, a frequency domain encoding information generator 220, a frequency domain scan unit 230, and an entropy encoder 240. An encoding stream generator in the apparatus for subband-coding the frequency conversion unit according to the present disclosure may be implemented using the entropy encoder 240.

The frequency domain splitter 210 receives a frequency conversion block, and splits a frequency conversion unit of the received frequency conversion block into one or more frequency domains.

The frequency domain encoding information generator 220 identifies whether there is a non-zero frequency coefficient in each of the split frequency domains, and generates frequency domain encoding information.

The frequency domain scan unit 230 receives the frequency domain encoding information from the frequency domain encoding information generator 220 and scans a frequency coefficient of each frequency domain to generate a frequency domain frequency coefficient stream.

The entropy encoder 240 binarizes and encodes the frequency domain encoding information and the scanned frequency domain frequency coefficient stream.

Figure 3A:
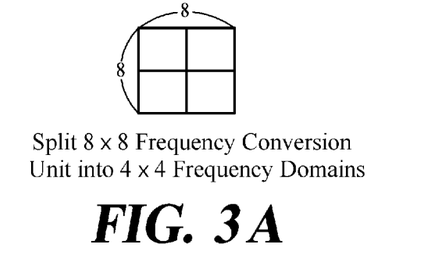
FIGS. 3A to 3F illustrate various examples of splitting the frequency conversion unit into a plurality of frequency domains.
Figure 3B:
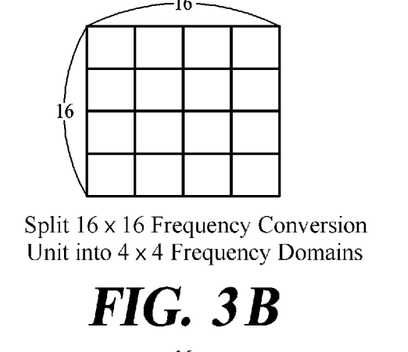
Figure 3C:
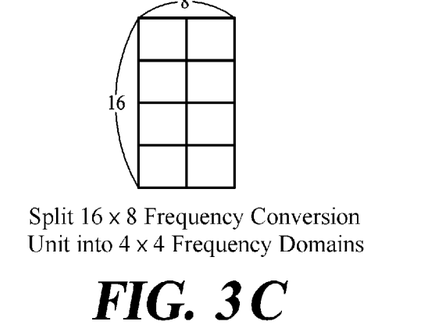
Figure 3D:
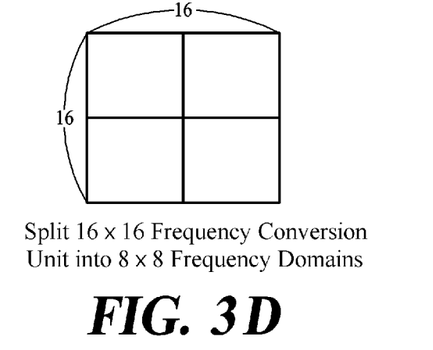
Figure 3E:
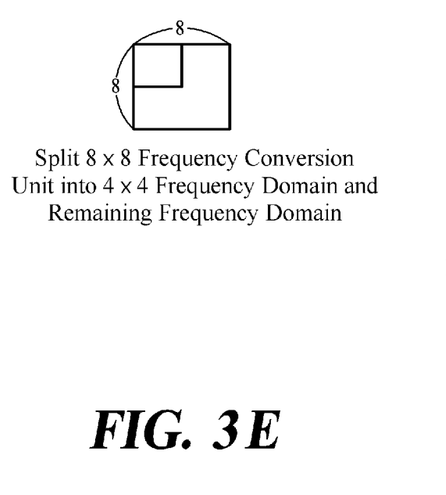
Figure 3F:
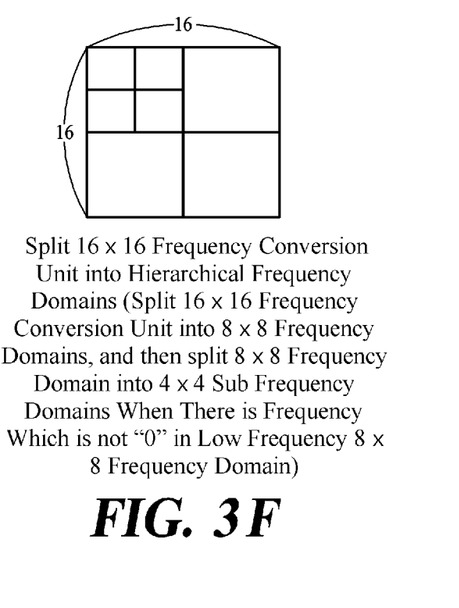
Figure 4:
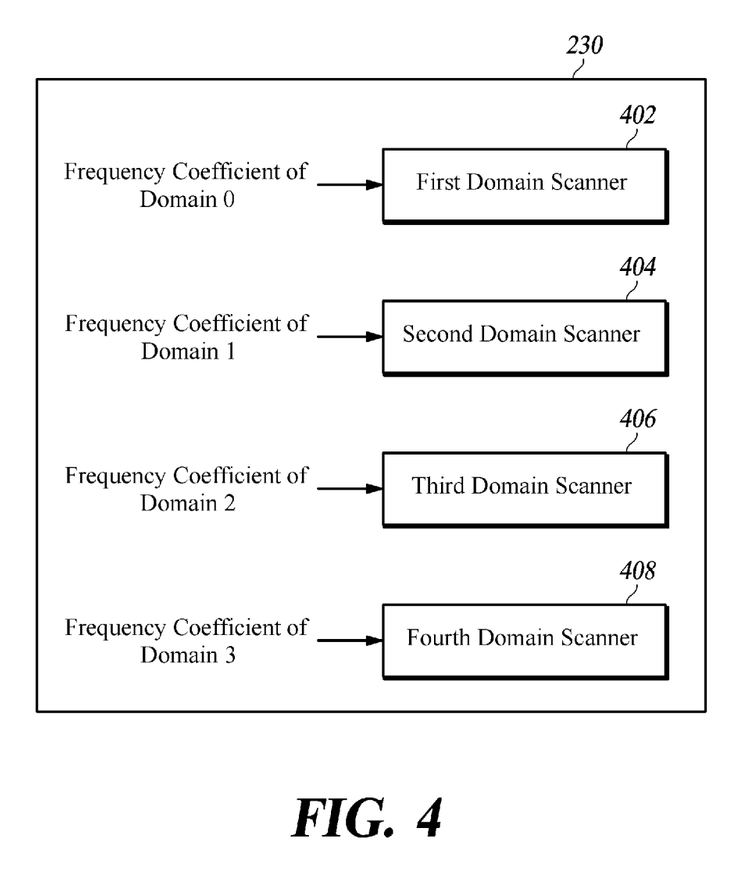
FIG. 4 illustrates numbers of frequency domains when a 16×16 frequency conversion unit is split into four 8×8 frequency domains.

FIGS. 3A to 3F illustrate various examples of splitting the frequency conversion unit into a plurality of frequency domains, and FIG. 4 illustrates numbers of the frequency domains when a 16×16 frequency conversion unit is split into four 8×8 frequency domains. In FIG. 4, domain 0 corresponds to a low frequency domain, and domain 3 corresponds to a highest frequency domain.

FIG. 3A illustrates four 4×4 frequency domains equally split from an 8×8 frequency conversion unit, FIG. 3B illustrates sixteen 4×4 frequency domains equally split from the 16×16 frequency conversion unit, FIG. 3C illustrates eight 4×4 frequency domains equally split from an 8×16 frequency conversion unit, and FIG. 3D illustrates four 8×8 frequency domains equally split from a 16×6 frequency conversion unit.

As illustrated in FIG. 3A to 3D, a frequency domain unit by which the frequency domain splitter 210 splits the frequency conversion unit may be a 4×4 unit or an 8×8 unit.

Further, as illustrated in FIG. 3E, the frequency conversion unit may be split into the low frequency domain and one or more remaining domains except for the low frequency domain. In addition, the low frequency domain may be the left uppermost domain of the frequency conversion unit when a length and a width of the frequency conversion unit are equally split in half, respectively. For example, FIG. 3E illustrates that the 8×8 frequency conversion unit is split into a 4×4 low frequency domain located in the left uppermost domain and the remaining frequency domain.

The frequency domain encoding information generator 220 identifies whether there is the non-zero frequency coefficient in each of the split frequency domains. The frequency domain encoding information generator 220 generates corresponding frequency domain encoding information divisibly for a case where there is no non-zero frequency coefficient in the frequency domain and a case where there is even a single non-zero frequency coefficient. For example, the frequency domain encoding information generator 220 can generate "0" as frequency domain encoding information of the corresponding frequency domain when there is no non-zero frequency coefficient in the frequency domain, and generate "1" as frequency domain encoding information of the corresponding frequency domain when there is even a single non-zero frequency coefficient.

The frequency domain scan unit 230 receives the frequency domain encoding information from the frequency domain encoding information generator 220 and scans the frequency coefficient of each frequency domain to generate the frequency domain frequency coefficient stream.

Figure 5:
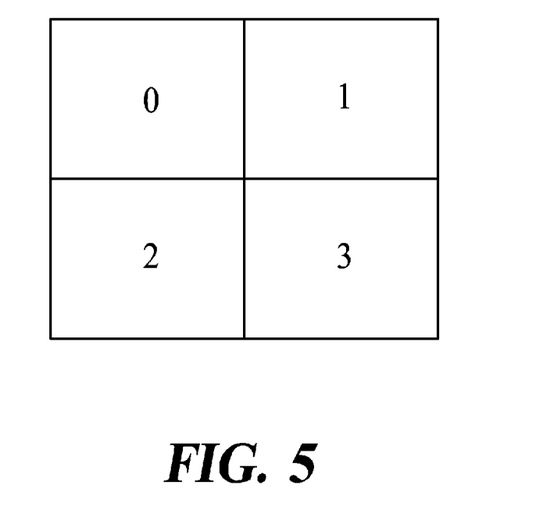
FIG. 5 illustrates an example schematized from parallel scan operations of a frequency domain scan unit 230.

FIG. 5 illustrates an example schematized from parallel scan operations of the frequency domain scan unit 230.

As illustrated in FIG. 5, the frequency domain scan unit 230 can scan frequency coefficients of respective frequency domains in parallel for each frequency domain. That is, when the frequency conversion unit is split into four frequency domains as illustrated in FIG. 4, the frequency domain scan unit 230 independently scans each frequency domain by using a separate scanner, so that the frequency domain scan unit 230 can simultaneously perform scan operations of the four domains. As a result, one domain scanner has only to scan a frequency domain having a size smaller than a size of the frequency conversion unit, and thus the scanner may be more simply implemented. Here, domain 0 of FIG. 4 may be scanned by a first domain scanner 402, domain 1 may be scanned by a second domain scanner 404, domain 2 may be scanned by a third domain scanner 406, and domain 3 may be scanned by a fourth domain scanner 408 in parallel. For reference, the first to fourth scanners 402, 404, 406, and 408 do not fixedly exist within the scan unit 230, and processes for variably scanning the respective frequency domains according to the number of frequency domains may be generated within the frequency domain scan unit 230.

Further, the frequency domain scan unit 230 receives the frequency domain encoding information and scans only the frequency coefficient of the frequency domain having the non-zero frequency coefficient to generate the frequency domain frequency coefficient stream. That is, the frequency coefficient of the frequency domain having only the frequency coefficient which is "0" may not be scanned.

Meanwhile, the frequency domain splitter 210 receives the frequency domain encoding information from the frequency domain encoding information generator 220, and may split again the frequency domain into one or more sub frequency domains if the frequency domain has the non-zero frequency coefficient.

For example, the frequency domain splitter 210 can split the frequency conversion unit into hierarchical frequency domains like a case of the 16×16 frequency conversion unit of FIG. 3F. That is, the frequency domain splitter 210 splits the 16×16 frequency conversion unit into 8×8 frequency domains. When the frequency domain splitter 210 receives the frequency domain encoding information indicating that there is a non-zero frequency in a low frequency 8×8 frequency domain from the frequency domain encoding information generator 220, the frequency domain splitter 210 splits the low frequency 8×8 frequency domain into sub frequency domains by splitting the low frequency 8×8 frequency domain into 4×4 frequency domains, and transmits information on a sub frequency domain division to the frequency domain encoding information generator 220. In this event, the frequency domain encoding information generator 220 identifies again whether there is a non-zero frequency coefficient in a corresponding sub frequency domain, and generates corresponding sub frequency domain encoding information divisibly for a case where there is no non-zero frequency coefficient in the sub frequency domain and a case where there is even a single non-zero frequency coefficient.

The entropy encoder 240 receives the frequency domain encoding information from the frequency domain encoding information generator 220 and receives the scanned frequency domain frequency coefficient stream from the frequency domain scan unit 230 to binarize and encode the frequency domain encoding information and the scanned frequency domain frequency coefficient stream.

At this time, the entropy encoder 240 can binarize the frequency domain encoding information into a one bit size having "0" or "1" for each frequency domain.

Further, the entropy encoder 240 can encode the frequency domain encoding information with reference to a probability that the frequency domain encoding information is generated.

Table 1 shows an example of binary information according to the frequency domain encoding information of each frequency domain of the frequency conversion unit.

TABLE 1

| Binary Code | Frequency Domain 0 | Frequency Domain 1 | Frequency Domain 2 | Frequency Domain 3 |
|---|---|---|---|---|
| 0 | 0 | 0 | 0 | 0 |
| 1111000 | 0 | 0 | 0 | 1 |
| 1111001 | 0 | 0 | 1 | 0 |
| 1111010 | 0 | 0 | 1 | 1 |
| 1111011 | 0 | 1 | 0 | 0 |
| 1111100 | 0 | 1 | 0 | 1 |
| 1111101 | 0 | 1 | 1 | 0 |
| 1111110 | 0 | 1 | 1 | 1 |
| 10 | 1 | 0 | 0 | 0 |
| 111000 | 1 | 0 | 0 | 1 |
| 1101 | 1 | 0 | 1 | 0 |
| 111001 | 1 | 0 | 1 | 1 |
| 1100 | 1 | 1 | 0 | 0 |
| 111010 | 1 | 1 | 0 | 1 |
| 111011 | 1 | 1 | 1 | 0 |
| 1111111 | 1 | 1 | 1 | 1 |

Four bit frequency domain encoding information may be encoded by storing a lookup table such as Table 1 based on the probability that there is the non-zero frequency coefficient in frequency domains 0, 1, 2, and 3 illustrated in FIG. 4.

As shown in Table 1, while the number of binary code bits generated when frequency domain encoding information of the remaining frequency domains except for domain 0 corresponding to the low frequency domain is all "0" is small, the number of binary code bits generated when frequency domain encoding information of the remaining frequency domains except for domain 0 corresponding to the low frequency domain is all "1" is relatively large. The frequency domain encoding information of the remaining frequency domains except for domain 0 corresponding to the low frequency domain is likely to be "0", thereby increasing the total encoding efficiency.

Meanwhile, since making the lookup table such as Table 1 based on the probability is already known, its detailed description will be omitted.

Figure 6:
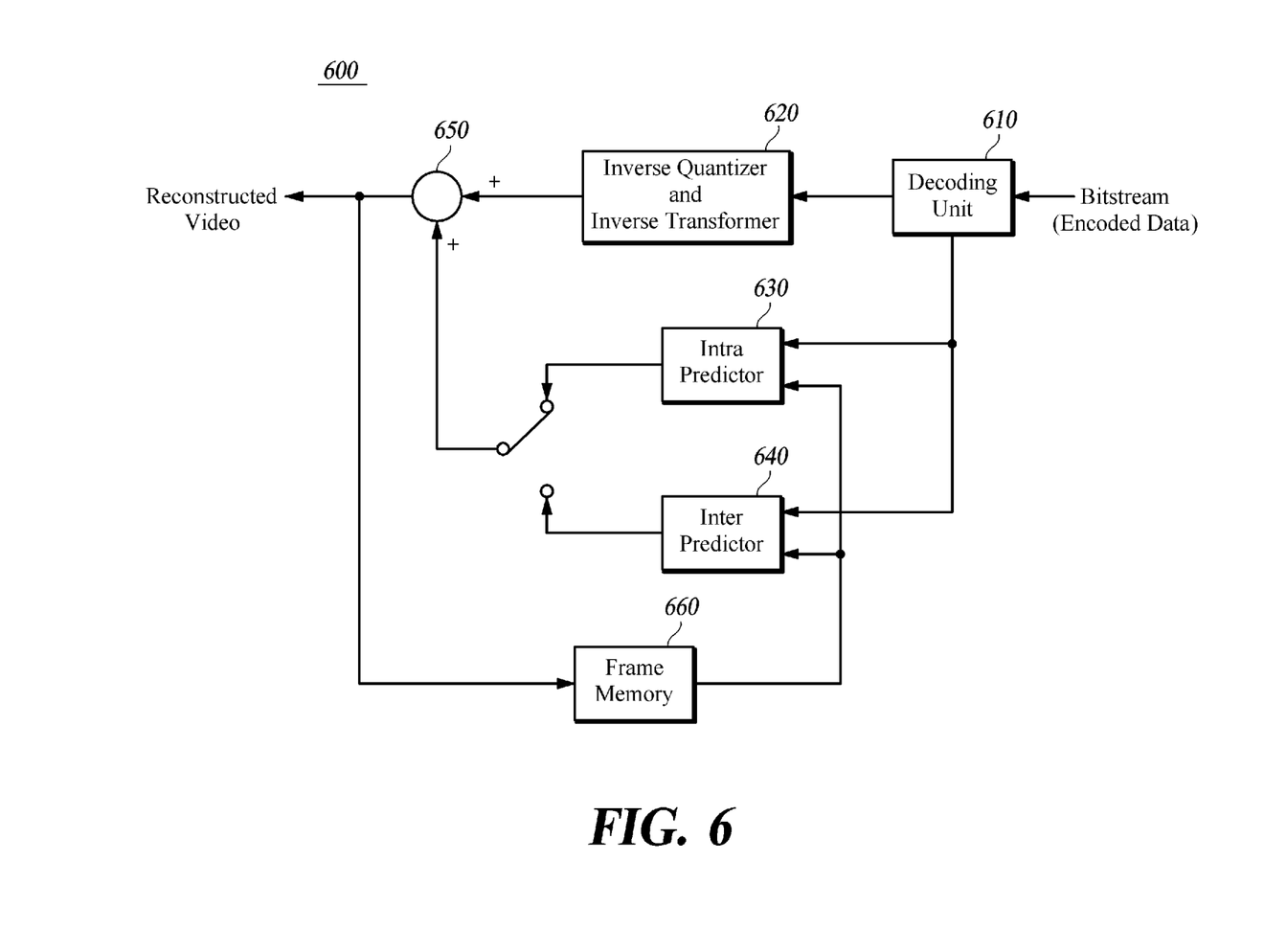
FIG. 6 is a block diagram schematically illustrating a configuration of a video decoding apparatus according to an embodiment of the present disclosure.

FIG. 6 is a block diagram schematically illustrating a configuration of a video decoding apparatus according to an embodiment of the present disclosure.

A video decoding apparatus 600 according to an embodiment of the present disclosure may include a decoder 610, an inverse quantizer and inverse transformer 620, a predictor 630 or 640, an adder 650, and a frame memory 660.

The decoder 610 decodes the encoded data and extracts information required for a block decoding. The decoder 610 can extract the encoded residual block from the first field included in the encoded data and decode the extracted residual block, extract information required for a prediction from the second field included in the encoded data, and transmit the extracted information required for the prediction to the intra predictor 630 or the inter predictor 640.

The decoder 610 receives the encoded data, extracting frequency domain encoding information and a frequency domain frequency coefficient stream, divides a frequency conversion unit into one or more frequency domains according to the frequency domain encoding information, and inversely scans the corresponding frequency domain frequency coefficient stream according to the frequency domain encoding information and sets a quantization coefficient to reconstruct a transformed and quantized frequency conversion block. That is, the decoder 610 can decode the encoded data to extract the frequency domain encoding information, set all quantization frequency coefficients of the corresponding frequency domain to "0" when the frequency domain encoding information is "0" for the frequency domain, extract the frequency domain quantization frequency coefficient stream from the bitstream (encoded data) when the frequency domain encoding information is "1", and inversely scan the frequency domain quantization frequency coefficient stream through various inverse scanning methods such as an inverse zigzag scan and the like and set the frequency domain quantization frequency coefficient to generate the residual block (that is, transformed and quantized frequency conversion block) having the quantization frequency coefficient in every frequency domain.

Here, when the frequency domain has the frequency domain encoding information which is "0", the decoder 610 can set all quantization coefficients of the corresponding frequency domain of the frequency conversion unit to "0" and inversely scan the frequency domain frequency coefficient stream of the frequency domain where there is the frequency domain having the frequency domain encoding information which is not "0" to reconstruct the transformed and quantized frequency conversion block (that is, transformed and quantized residual block).

Further, the decoder 610 can extract the frequency domain encoding information from the encoded data with reference to the probability that the frequency domain encoding information is generated. In this event, the decoder 610 can extract the frequency domain encoding information by using the same lookup table as the lookup table stored by the encoder 150 of the video encoding apparatus 100.

Meanwhile, the decoder 610 can split the frequency conversion unit by the unit of 4×4 subblocks or 8×8 subblocks in the same way as that of the video encoding apparatus 100, and split the frequency conversion unit into the low frequency domain and the remaining domain except for the low frequency domain. Further, the low frequency domain may be the left uppermost domain of the frequency conversion unit when a length and a width of the frequency conversion unit are equally split in half, respectively.

Meanwhile, the decoder 610 can inversely scan the frequency domain frequency coefficient stream in parallel for each frequency domain. That is, when the encoder 150 scans the frequency domain frequency coefficient stream in parallel for each frequency domain, a plurality of domain scanners (not shown) may be included within the decoder 610 similar to a case where a plurality of domain scanners 402 to 404 are included within the encoder 150.

Meanwhile, the decoder 610 decodes the encoded data to decode or extract information required for the decoding as well as the transformed and quantized residual block. The information required for the decoding refers to information required for decoding the encoded bitstream within the encoded data. For example, the information may include information on a block type, information on an intra prediction mode when a prediction mode is the intra prediction mode, and information on the motion vector when the prediction mode is an inter prediction mode, information on a transform and quantization type and the like, but may include various information as well as the above-listed information.

The inverse quantizer and inverse transformer 620 inversely quantizes and inversely transforms the transformed and quantized residual block which is decoded to reconstruct the residual block.

The predictor 630 or 640 predicts the current block to generate the predicted block. At this time, the corresponding predictor 630 or 640 can predict the current block in the same way as that of the predictor 110 or 120 of the video encoding apparatus 100.

The adder 650 adds the residual block reconstructed by the inverse quantizer and inverse transformer 630 and the predicted block generated by the predictor 640 to reconstruct the current block. The current block reconstructed by the adder 650 is transferred to the frame memory 660, and may be used for predicting another block by the predictor 630 or 640.

The frame memory 660 stores a reconstructed video to allow an intra and inter prediction block to be generated.

Meanwhile, the video encoding/decoding apparatus according to an embodiment of the present disclosure may be implemented by connecting an encoded data output terminal of the video encoding apparatus 100 of FIG. 1 to an encoded data input terminal of the video decoding apparatus 600 of FIG. 6.

The video encoding/decoding apparatus according to an embodiment of the present disclosure includes a video encoder for predicting the current block to generate the predicted block, subtracting the predicted block from the current block to generate the residual block, transforming and quantizing the residual block to generate the frequency conversion block, splitting the frequency conversion unit of the frequency conversion block into one or more frequency domains and identifying whether there is the non-zero frequency coefficient in each frequency domain to generate the frequency domain encoding information, scanning the frequency coefficient of each frequency domain to generate the frequency domain frequency coefficient stream, and binarizing and encoding the frequency domain encoding information and the scanned frequency domain frequency coefficient stream; and a video decoder for receiving the encoded data to extract the frequency domain encoding information and the frequency domain frequency coefficient stream, splitting the frequency conversion unit into one or more frequency domains according to the frequency domain encoding information, inversely scanning the frequency domain frequency coefficient stream according to the frequency domain encoding information to set the quantization coefficient, reconstructing the transformed and quantized frequency conversion block, inversely quantizing and inversely transforming the frequency conversion block to reconstruct the residual block, predicting the current block to generate the predicted block, and adding the reconstructed residual block and the predicted block to reconstruct the current block.

Here, the video encoder may be implemented as the video encoding apparatus 100 according to an embodiment of the present disclosure, and the video decoder may be implemented as the video decoding apparatus 600 according to an embodiment of the present disclosure.

Figure 7:
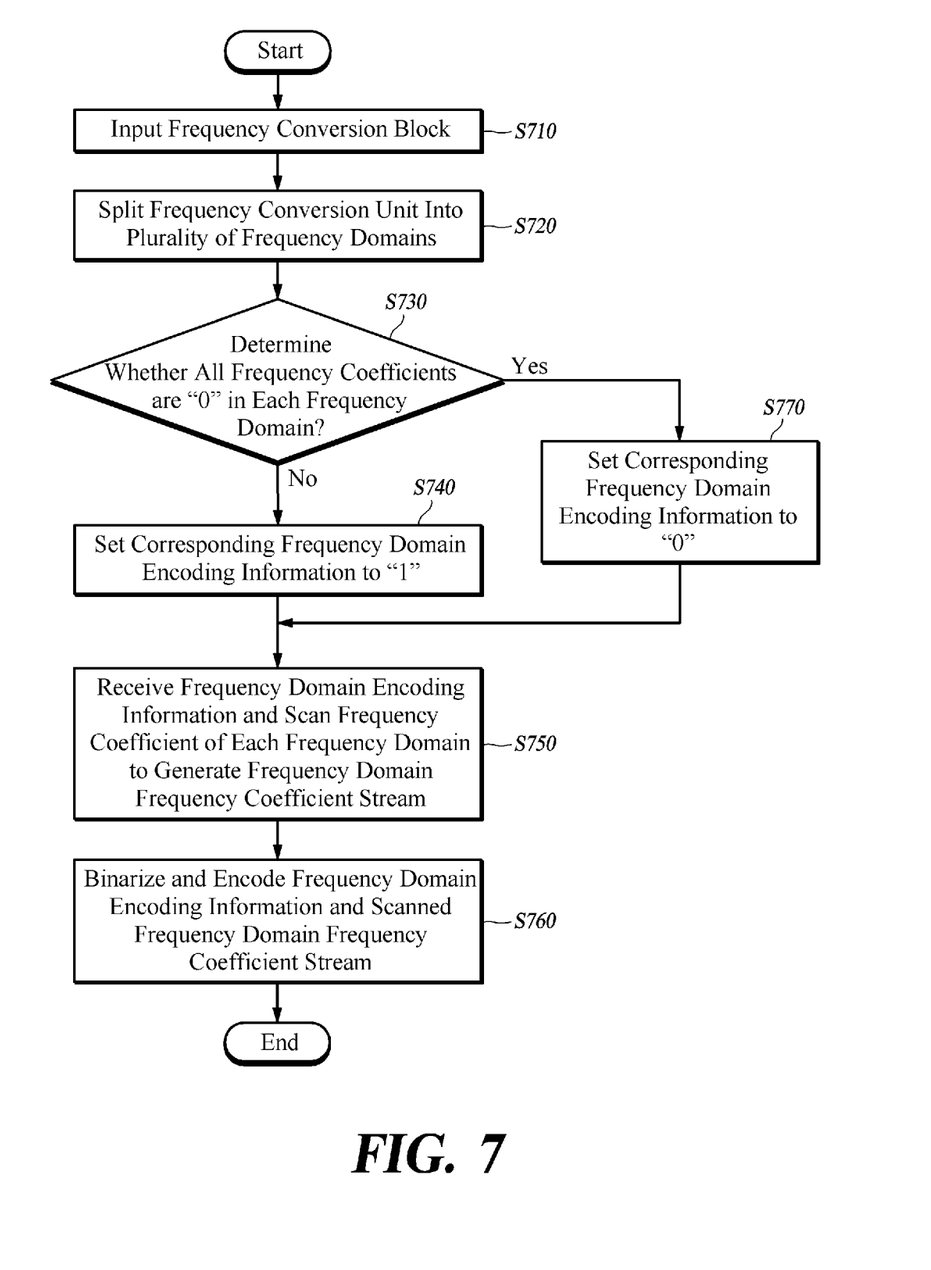
FIG. 7 is a flowchart illustrating a method of subband-coding a frequency conversion unit.

FIG. 7 is a flowchart illustrating a method of subband-coding the frequency conversion unit according to an embodiment of the present disclosure.

The following description will be made with reference to FIGS. 2 to 7.

As illustrated in FIG. 7, the method of subband-coding the frequency conversion unit according to an embodiment of the present disclosure includes a block receiving step (S710) of receiving a frequency conversion block, a frequency domain split step (S720) of splitting a frequency conversion unit of the frequency conversion block into one or more frequency domains, a step (S730) of identifying whether there is a non-zero frequency coefficient in each frequency domain, a step (S770) of setting frequency domain encoding information to "0" when all frequency coefficients are "0", a step (S740) of setting the generated frequency domain encoding information to "1" when there is even a single non-zero frequency coefficient, a frequency domain scan step (S750) of receiving the frequency domain encoding information and scanning the frequency coefficient of each frequency domain to generate a frequency domain frequency coefficient stream, and an encoding stream generating step (S760) of binarizing and encoding the frequency domain encoding information and the scanned frequency domain frequency coefficient stream.

Here, since the block receiving step (S710) and the frequency domain split step (S720) correspond to operations of the frequency domain splitter 210, the step (S730), the step (S740), and the step (S770) correspond to operations of the frequency domain encoding information generator 220, the frequency domain scan step (S750) corresponds to an operation of the frequency domain scan unit 230, and the encoding stream generating step (S760) corresponds to an operation of the entropy encoding unit 240, their detailed descriptions will be omitted.

Meanwhile, referring to FIGS. 1 to 5, a video encoding method according to an embodiment of the present disclosure includes a prediction step (S810) of predicting a current block to generate a predicted block, a subtraction step (S820) of subtracting the predicted block from the current block to generate a residual block, a transform and quantization step (S830) of transforming and quantizing the residual block to generate a frequency conversion block, and an encoding step (S840) of receiving the frequency conversion block to split a frequency conversion unit of the frequency conversion block into one or more frequency domains, identifying whether there is a non-zero frequency coefficient in each frequency domain to generate frequency domain encoding information, scanning the frequency coefficient of each frequency domain to generate a frequency domain frequency coefficient stream, and binarizing and encoding the frequency domain encoding information and the scanned frequency domain frequency coefficient stream.

Here, since the prediction step (S810) corresponds to an operation of the predictor 110 or 120, the subtraction step (S820) corresponds to an operation of the subtractor 130, the transform and quantization step (S830) corresponds to an operation of the transformer and quantizer 140, and the encoding step (S840) corresponds to an operation of the encoding unit 150, their detailed descriptions will be omitted.

Meanwhile, referring to FIGS. 2 to 6, a video decoding method according to an embodiment of the present disclosure includes a decoding step (S910) of receiving encoded data to extract the frequency domain encoding information and the frequency domain frequency coefficient stream, splitting the frequency conversion unit into one or more frequency domains according to the frequency domain encoding information, and inversely scanning the frequency domain frequency coefficient stream according to the frequency domain encoding information and setting a quantization coefficient to reconstruct the transformed and quantized frequency conversion block, an inverse quantization and inverse transform step (S920) of inversely quantizing and inversely transforming the frequency conversion block to reconstruct the residual block, a prediction step (S930) of predicting the current block to generate the predicted block, and an addition step (S940) of adding the reconstructed residual block and the predicted block to reconstruct the current block.

Here, since the decoding step (S910) corresponds to an operation of the decoding unit 610, the inverse quantization and inverse transform step (S920) corresponds to an operation of the inverse quantizer and inverse transformer 620, the prediction step (S930) corresponds to an operation of the predictor 630 or 640, and the addition step (S940) corresponds to an operation of the adder 650, their detailed descriptions will be omitted.

The video encoding/decoding method according to an embodiment of the present disclosure may be implemented by combining the video encoding method according an embodiment of the present disclosure and the video decoding method according to an embodiment of the present disclosure.

The video encoding/decoding method according to an embodiment of the present disclosure includes a video encoding step (implemented by the video encoding method according to an embodiment of the present disclosure) of predicting a current block to generate a predicted block, subtracting the predicted block from the current block to generate a residual block, transforming and quantizing the residual block to generate a frequency conversion block, and splitting a frequency conversion unit of the frequency conversion block into one or more frequency domains, identifying whether there is a non-zero frequency coefficient in each frequency domain to generate frequency domain encoding information, scanning the frequency coefficient of each frequency domain to generate a frequency domain frequency coefficient stream, and binarizing and encoding the frequency domain encoding information and the scanned frequency domain frequency coefficient stream, and a video decoding step (implemented by the video decoding method according to an embodiment of the present disclosure) of receiving encoded data to extract the frequency domain encoding information and the frequency domain frequency coefficient stream, splitting the frequency conversion unit into one or more frequency domains according to the frequency domain encoding information, and inversely scanning the frequency domain frequency coefficient stream according to the frequency domain encoding information and setting a quantization coefficient to reconstruct the transformed and quantized frequency conversion block, inversely quantizing and inversely transforming the frequency conversion block to reconstruct the residual block, predicting the current block to generate the predicted block, and adding the reconstructed residual block and the predicted block to reconstruct the current block.

Here, the video encoding step may be implemented by the video encoding step according to an embodiment of the present disclosure, and the video decoding step may be implemented by the video decoding step according to an embodiment of the present disclosure.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the as embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields of encoding and decoding a frequency conversion unit of a frequency conversion block in that the frequency conversion unit is split into one or more frequency domains, frequency domain encoding information is encoded so that it is indicated whether there is a non-zero frequency coefficient for each frequency domain, and the frequency conversion block is encoded reflecting a video characteristic, thereby improving a video compression efficiency and easily achieving an implementation.

What is claimed is:

1. A method performed by an apparatus for decoding a current block corresponding to a two dimensional frequency conversion unit having a size larger than or equal to a 8×8 pixel size, the method comprising:

generating a predicted block by intra-predicting the current block using pre-reconstructed neighboring pixels of the current block;

reconstructing frequency coefficients of the frequency conversion unit by decoding a bitstream, to generate a frequency conversion block having a size of the frequency conversion unit, wherein the frequency conversion unit is a unit of transforming residual signals that are differences between original pixel values and predicted pixel values, and the frequency coefficients are values generated by transform of the residual signals from a spatial domain into a frequency domain;

inversely transforming the frequency coefficients in the frequency conversion block from the frequency domain into the spatial domain by using a transform size identical to the size of the frequency conversion unit, to reconstruct a residual block having the residual signals; and adding the reconstructed residual block to the predicted block, to thereby reconstruct the current block wherein the frequency conversion block is generated by reconstructing and inversely scanning the frequency coefficients of the frequency conversion unit in the unit of two dimensional subblocks divided from the frequency conversion unit, all of the subblocks divided from the frequency conversion unit being equal-sized square blocks which have a 4×4 pixel size regardless of the size of the frequency conversion unit, wherein the reconstructing and inversely scanning of the frequency coefficients in the unit of the subblocks comprises:

decoding, from the bitstream, subblock encoding information indicating whether a subblock of the 4×4 pixel size in the frequency conversion unit corresponding thereto has at least one non-zero frequency coefficient, wherein:

a value of the decoded subblock encoding information is 0 when the subblock does not have at least one non-zero frequency coefficient, and the value of the decoded subblock encoding information is 1 when the subblock has at least one non-zero frequency coefficient;

reconstructing from the bitstream and inversely scanning frequency coefficients corresponding to the subblock, when the decoded subblock encoding information indicates that the subblock has at least one non-zero frequency coefficient; and setting all frequency coefficients corresponding to the subblock to 0, when the decoded subblock encoding information indicates that the subblock does not have at least one non-zero frequency coefficient, wherein each of the subblocks includes frequency coefficients corresponding to a frequency range, the frequency range of each of the subblocks being different from each other, wherein the frequency coefficients which are located at different positions in each of the subblocks are values in the frequency domain which correspond to different frequencies.

2. The method of claim 1, wherein the subblocks are reconstructed in parallel.

3. A method performed by an apparatus for encoding a current block corresponding to a two dimensional frequency conversion unit having a size larger than or equal to a 8×8 pixel size, the method comprising:

generating a predicted block by intra-predicting the current block using pre-reconstructed neighboring pixels of the current block;

generating a residual block by subtracting the prediction block from the current block;

transforming the residual block from a spatial domain into a frequency domain by using a transform size identical to the size of the frequency conversion unit, to generate a frequency conversion block having the size of the frequency conversion unit;

encoding frequency coefficients in the frequency conversion block in the unit of two dimensional subblocks divided from the frequency conversion block, all of the subblocks divided from the frequency conversion block being equal-sized square blocks which have a 4×4 pixel size regardless of the size of the frequency conversion block, wherein the encoding of the frequency coefficients comprises:

encoding subblock encoding information indicating whether a subblock of the 4×4 pixel size in the frequency conversion unit corresponding thereto has at least one non-zero frequency coefficient, wherein:

a value of the subblock encoding information is 0 when the subblock does not have at least one non-zero frequency coefficient, and the value of the subblock encoding information is 1 when the subblock has at least one non-zero frequency coefficient;

encoding frequency coefficients corresponding to the subblock, when the subblock encoding information indicates that the subblock has at least one non-zero frequency coefficient, wherein, when the subblock encoding information indicates that the subblock does not have at least one non-zero frequency coefficient, the frequency coefficients corresponding to the subblock are not encoded, wherein each of the subblocks includes frequency coefficients corresponding to a frequency range, the frequency range of each of the subblocks being different from each other, wherein the frequency coefficients which are located at different positions in each of the subblocks are values in the frequency domain which correspond to different frequencies.

4. The method of claim 3, wherein the subblocks are encoded in parallel.

5. A non-transitory recording medium storing a bitstream generated by a method of encoding a current block corresponding to a two dimensional frequency conversion unit having a size larger than or equal to a 8×8 pixel size, the method comprising:

generating a predicted block by intra-predicting the current block using pre-reconstructed neighboring pixels of the current block;

generating a residual block by subtracting the prediction block from the current block;

transforming the residual block from a spatial domain into a frequency domain by using a transform size identical to the size of the frequency conversion unit, to generate a frequency conversion block having the size of the frequency conversion unit;

encoding frequency coefficients in the frequency conversion block in the unit of two dimensional subblocks divided from the frequency conversion block, all of the subblocks divided from the frequency conversion block being equal-sized square blocks which have a 4×4 pixel size regardless of the size of the frequency conversion block, wherein the encoding of the frequency coefficients in the frequency conversion block comprises:

encoding subblock encoding information indicating whether a subblock of the 4×4 pixel size in the frequency conversion unit corresponding thereto has at least one non-zero frequency coefficient, wherein:

a value of the subblock encoding information is 0 when the subblock does not have at least one non-zero frequency coefficient, and the value of the subblock encoding information is 1 when the subblock has at least one non-zero frequency coefficient;

encoding frequency coefficients corresponding to the subblock, when the subblock encoding information indicates that the subblock has at least one non-zero frequency coefficient, wherein, when the subblock encoding information indicates that the subblock does not have at least one non-zero frequency coefficient, the frequency coefficients corresponding to the subblock are not encoded, wherein each of the subblocks includes frequency coefficients corresponding to a frequency range, the frequency range of each of the subblocks being different from each other, wherein the frequency coefficients which are located at different positions in each of the subblocks are values in the frequency domain which correspond to different frequencies.

* * * * *

UNITED STATES PATENT AND TRADEMARK OFFICE
CERTIFICATE OF CORRECTION

| | | |
|---|---|---|
| PATENT NO. | : 11,997,268 B2 | Page 1 of 1 |
| APPLICATION NO. | : 17/970878 | |
| DATED | : May 28, 2024 | |
| INVENTOR(S) | : Jinhan Song et al. | |

It is certified that error appears in the above-identified patent and that said Letters Patent is hereby corrected as shown below:

In the Claims

Claim 3, Column 16, Lines 66 and 67, "the prediction block" should be changed to --the predicted block--; and Claim 5, Column 18, Lines 4 and 5, "the prediction block" should be changed to --the predicted block--.

Signed and Sealed this
Twenty-first Day of January, 2025

Coke Morgan Stewart
*Acting Director of the United States Patent and Trademark Office*